Sept. 21, 1943.  C. C. FARMER  2,329,749
BRAKE CONTROL VALVE DEVICE
Filed March 29, 1941  3 Sheets-Sheet 1
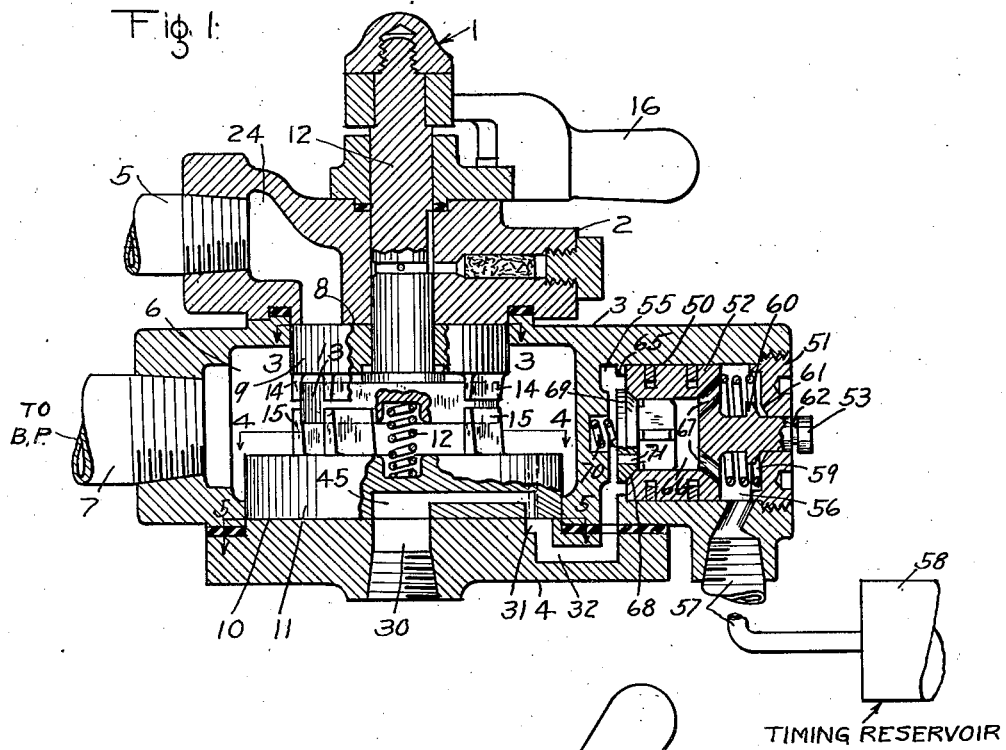
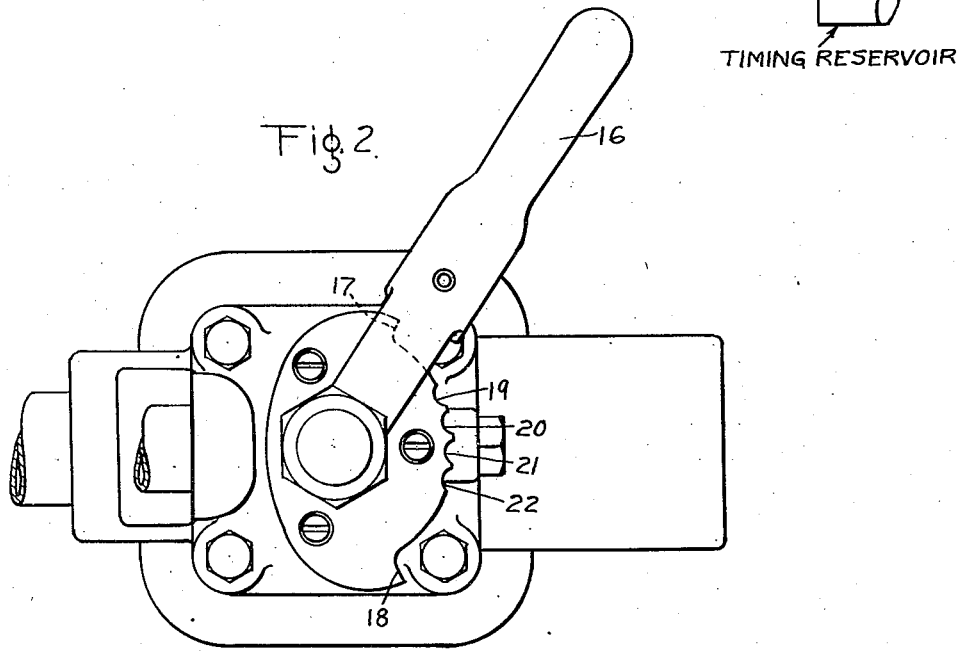
INVENTOR
CLYDE C. FARMER.
BY
ATTORNEY

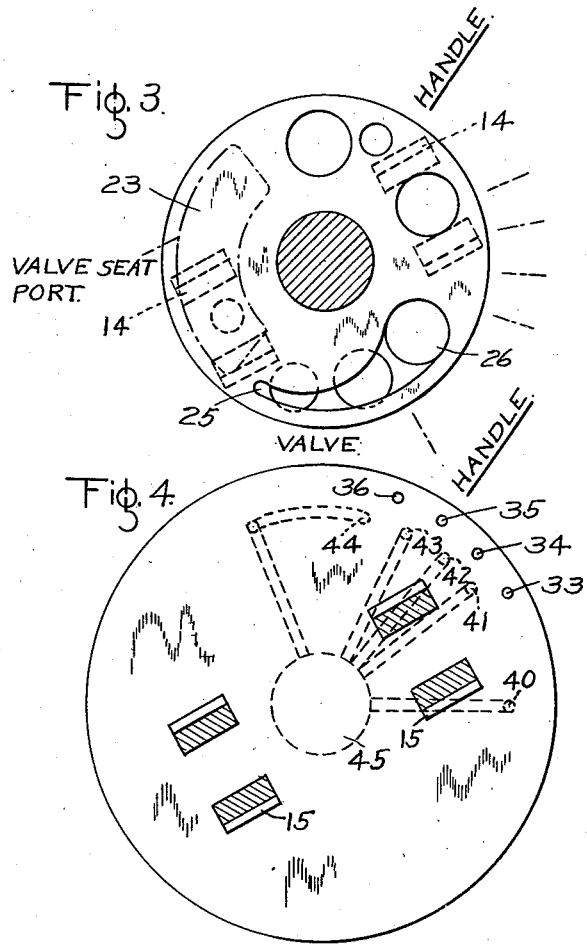
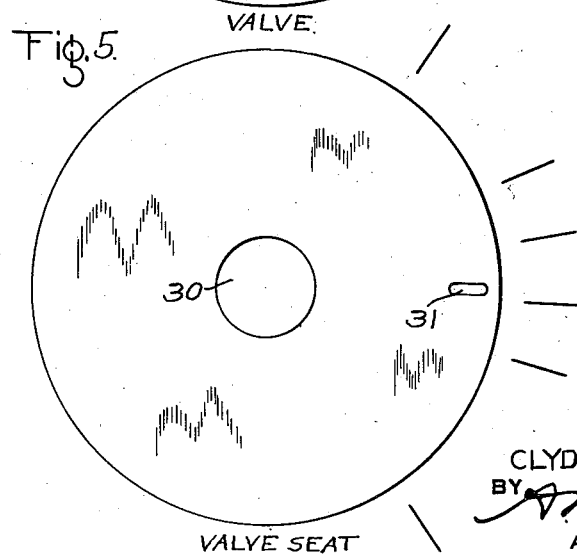

Sept. 21, 1943.                 C. C. FARMER                         2,329,749
                          BRAKE CONTROL VALVE DEVICE
                   Filed March 29, 1941              3 Sheets-Sheet 3
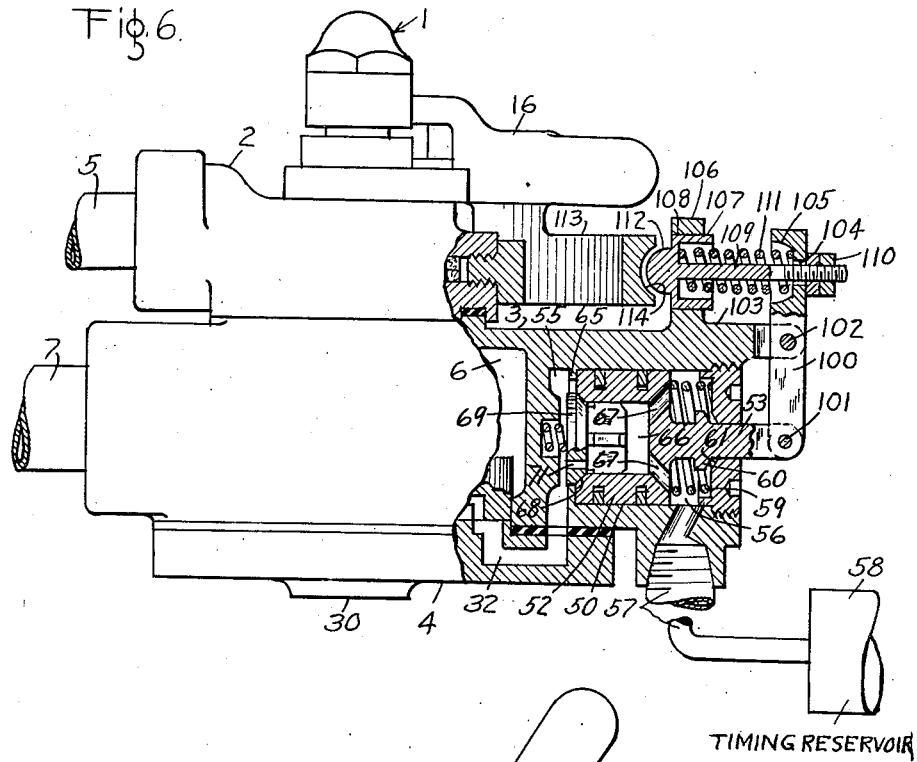
TIMING RESERVOIR
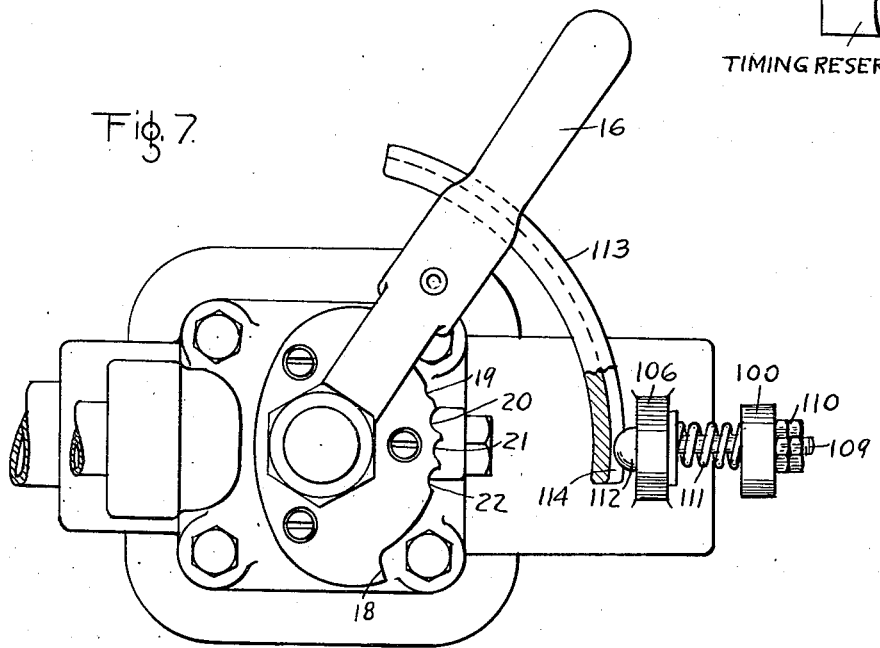
INVENTOR
CLYDE C. FARMER,
BY
ATTORNEY Patented Sept. 21, 1943

2,329,749

UNITED STATES PATENT OFFICE 2,329,749

BRAKE CONTROL VALVE DEVICE

Clyde C. Farmer, Pittsburgh, Pa., assignor to The Westinghouse Air Brake Company, Wilmerding, Pa., a corporation of Pennsylvania Application March 29, 1941, Serial No. 385,886

6 Claims. (Cl. 303—51)

This invention relates to control valve devices for use in connection with fluid pressure brakes, and other fluid pressure systems and more particularly to a brake valve device operative from a caboose or other rear car of a train, whereby a trainman may control the brakes independently of the engineman.

Caboose or cabin cars now in service are provided with one or another type of brake application valve device for effecting an application of the train brakes independently of the brake valve device or other equivalent control apparatus located on the locomotive or other leading vehicle of the train. These application valve devices are used to bring the train to a stop in case a trainman discovers a train or roadbed defect that may be considered dangerous, such as, for instance, a hot journal or a dragging brake beam, etc., and are also used particularly to control the train brakes when a train is backing up.

One such brake application valve device is shown, described and claimed in Patent No. 1,850,621 issued to C. C. Farmer, March 22, 1932. This type of brake application valve device is provided with a rotary valve which is formed with a plurality of ports of various flow areas which are adapted to be successively brought into registration with a single atmospheric vent port for effecting reductions in brake pipe pressure at different rates to provide the desired application of the brakes.

It is very desirable to be able to effect a full service application of the brakes of a train in as short a time as possible without causing heavy damaging slack run-in or run-out shocks. Since there is slack between coupled cars of a train, and since the brakes on a train will apply first on the car nearest the control valve device and then serially throughout the length of the train, it is necessary to so control the application of the brakes that the slack run-in or run-out will not be harsh enough to cause damage to the train. A brake control valve device constructed in accordance with the disclosure in the above mentioned patent will, if operated properly, produce the desired control of the brakes since it provides for a gradually increasing rate of reduction in brake pipe pressure when the several parts thereof are successively moved through the application positions provided.

While, as just pointed out, it is possible to operate the control valve device to control the train brakes so as not to produce harsh run-in or run-out of the slack in the train, a trainman, when he discovers a road bed or train defect or any other train operating condition which is grave enough to call for a full service application of the brakes, may become excited and as a consequence move the brake valve parts too rapidly through the several service application positions and thereby effect a reduction in brake pipe pressure at a rate which will quickly produce a heavy application of the brakes on the cars near the control valve device before any such degree of application can be produced on the other cars of the train and thus cause the slack in the train to run-in or run-out harshly.

Even if the trainman does exercise care in effecting a service application of the brakes under the above dangerous train operating conditions, he cannot be sure that the braking force of the brakes is not being increased too fast nor can he be sure that the braking force is being increased as fast as permissible. This uncertainty is due to the absence of anything to guide the trainman in the operation of the control valve device through its several service positions.

It is therefore the principal object of the invention to provide a trainman's brake control valve device of the above mentioned type, with means which operates automatically to guide the trainman in the operation of the device to produce a full service train brake application in the shortest possible time consistent with smooth train slack action, and thereby prevent damage to the train.

Another object of the invention is to provide an improved brake control valve device of the above mentioned type having a plurality of service application positions for controlling the rate of reduction in brake pipe pressure in effecting a service application of the brakes, and having means for indicating when the handle of the device may be moved from one service application position to the next without danger of causing harsh train slack run-in or run-out, thus insuring the attainment of the fastest possible rate of brake application on the train consistent with the gentle gathering or run-out of train slack.

A further object of the invention is to provide an improved brake controlling valve device of the above mentioned type having a plurality of service application positions for controlling the rate of reduction in brake pipe pressure in effecting a service application of the brakes, and having timing means for automatically determining the shortest interval of time that the handle should be maintained in one position before it may be moved into the next application position.

It is a still further object of the invention to provide an improved brake control valve device of the above mentioned type with new and useful improvements in construction, arrangement, and combination of the several parts of which it is composed as will be hereinafter more fully described and claimed.

These objects are attained by means of a timing apparatus which, when associated with the brake control valve device of the type having a plurality of service application or brake pipe venting positions for gradually increasing the rate of brake pipe production and thereby the brake application, is automatically operative in each of said service application positions to indicate to the operator when the valve device may be operated from one service application position to the next without danger of causing the slack in the train to run-in or run-out harshly. This timing apparatus may take many different forms but, as shown in the drawings and hereinafter more fully described, may be constructed and arranged to operate automatically immediately upon movement of the valve device to each service position to indicate that the device should not yet be moved to the next service position, and after a chosen interval of the time has elapsed to operate automatically to indicate that the device may be operated to the next service application position without causing harsh slack action.

In the accompanying drawings; Fig. 1 is a diagrammatic sectional view of the improved brake control valve device and showing the several parts of the device in their normal or non-braking position.

Fig. 2 is a plan view of the device shown in Fig. 1, and illustrates the operating handle and the usual notched quadrant for determining the various operating positions of the handle.

Fig. 3 is a sectional view taken on the line 3—3 of Fig. 1 and shows the upper rotary valve and the relative position of the rotary valve exhaust cavity in the upper rotary valve seat, the cavity being shown in dot and dash lines.

Fig. 4 is a sectional view taken on the line 4—4 of Fig. 1 and shows the lower auxiliary rotary valve of the device.

Fig. 5 is a sectional view taken on the line 5—5 of Fig. 1 and shows the valve seat for the lower rotary valve.

Fig. 6 is a combined elevational and vertical sectional view of a brake controlling valve device of substantially the same type as that shown in Fig. 1 but illustrating a modification of the indicating apparatus.

Fig. 7 is a plan view of the brake controlling valve device shown in Fig. 6.

The brake controlling valve devices 1 shown in Figs. 1 and 6 of the drawings are each of the type which is particularly suitable for controlling the fluid pressure brakes of a train from the caboose thereof, and which embodies means whereby the rate of reduction in brake pipe pressure in effecting a service application of the brakes may be gradually increased to apply the brakes in the shortest possible time consistent with the gentle gathering or run-out of the slack in the train.

As shown in Fig. 1 the brake control valve device may comprise a casing having a plurality of sections 2, 3, and 4, which are connected together in any suitable manner.

These sections define a valve chamber 6 which is in constant open communication with a pipe 7 leading to the usual brake pipe, not shown. The section 2 has a valve seat 8, formed on its inner face, for a rotary valve 9 mounted in chamber 6.

The section 4 also has a valve seat 10, formed on its inner face, for a rotary valve 11 mounted in the chamber 6. The rotary valves 9 and 11 are maintained against their respective seats 8 and 10 by means of a spring 12 interposed between and operatively engaging the valve 11 and portion 13 of the shaft 12, which portion, as will hereinafter more fully appear, is in operative engagement with the valve 9.

For the purpose of actuating the valves 9 and 11, the shaft 12 is provided which is journaled in the section 2. This shaft is preferably formed at its lower end with a horizontally extending cross piece 13 which engages lugs 14 and 15 formed on the upper and lower rotary valves 9 and 11, respectively. The upper end of the shaft 12 extends from the casing section 2 and has affixed thereto an operating handle 16.

The movement of the handle in either direction is limited by a pair of spaced projections or stops 17 and 18, which are formed on the outer face of the section 2, as shown in Fig. 2 of the drawings. These projections or stops are disposed in the path of travel of the usual spring pressed detent pin carried by the handle 16. The stop 17 defines or indicates the normal or non-braking position of the several parts of the device and the stop 18 defines or indicates the emergency position.

Between the projections or stops 17 and 18, the outer face of the section 2 is formed with a plurality of spaced notches 19, 20, 21 and 22, as shown in Fig. 2 of the drawings, which notches define or indicate four service application positions of the several parts of the brake controlling valve device. These notches are provided for the reception of the rounded outer end of the detent pin carried by the handle. As the handle 16 is operated the pin engages the quadrant within the notches 19, 20, 21 and 22, indicating to the operator the particular service positions of the rotary valves 9 and 11 as they are successively reached. As will hereinafter more fully appear fluid under pressure will be vented from the brake pipe in each service position, and as the valves are advanced through their several service positions the rate of reduction in brake pipe pressure will be increased. An arcuate brake pipe exhaust cavity 23, as shown in dot and dash lines in Fig. 3, is formed in the inner face or valve seat 8 of the casing section 2. This cavity 23 establishes an always open communication from the valve seat to a passage 24, in the section 2, which passage is connected to the atmosphere either directly or as shown in Fig. 1, through a pipe 5.

The face of the upper rotary valve 9 is provided with an arcuate cavity 25 which is connected at one end to a tail port 26 leading from the chamber 6, which chamber is in open communication with the pipe 7 leading from the brake pipe. This cavity diminishes in width from the end which is in communication with the port 26 to its other end and is so disposed that when the valve is actuated it will be brought into registration with the exhaust cavity 23 in the seat 8. It will be apparent that the flow area of the cavity 25 will be increased as the handle 16 and rotary valve 9 are moved in a clockwise direction through its several service application, as viewed in Fig. 3 of the drawings. When the handle 16 is in its normal non-operating position the cavity 25 is out of registration with the port 23 and communication between the chamber 6 and passage 24 is therefore cut off, as will be seen from an inspection of Figs. 1 and 3 of the drawings.

As shown in Figs. 1 and 5 of the drawings the lower valve seat 10 is provided with a central port 30 which leads to the atmosphere. This seat is further provided with an elongated radially disposed port 31 which leads to a passage 32.

The lower rotary valve 11 is formed with a series of spaced fluid pressure supply ports 33, 34, 35 and 36 which are so disposed that when the valve is actuated they will be successively brought into registration with the outer end of port 31 in the seat 10.

The lower rotary valve 11 is further provided with a series of spaced fluid pressure exhaust ports 40, 41, 42, 43 and 44 which are located nearer the axis of the valve than the supply ports 33, 34, 35 and 36, so that when the valve is actuated these ports will be successively brought into registration with the inner end of port 31 in the seat 10. The ports 40, 41, 42, 43 and 44 are arranged in staggered relationship with the ports 33, 34, 35 and 36 and are each connected to a central cavity 45, as shown in Fig. 4 of the drawings, which cavity is in constant communication with the port 30 in the seat.

The casing section 3 of the valve device is also provided with a bore 50 adapted to be closed by means of a plug nut 51 having screwthreaded engagement with the casing. Operatively mounted in the bore is a piston 52 having integrally formed therewith a stem 53, which stem is provided with a valve 60 adapted to engage a valve seat 61 formed on the inner face of the plug nut 51. The outer end portion of the stem extends through the nut 51 to the exterior of the casing and externally of the casing this end portion of the stem is provided with a telltale annular groove 62 which is always visible to the operator to indicate the two different positions of the stem.

It will be understood that if desired the stem may be shortened so that when it is in its innermost position the outer end surface thereof will be flush with the outer face of the plug nut 51 or some other telltale surface.

At one side of the piston 52 is a chamber 55 which is in constant open communication with passage 32. At the opposite side of the piston is a chamber 56 which is in constant open communication with a passage and pipe 57 leading to a timing reservoir 58.

Contained in chamber 56 is a spring 59 interposed between and operatively engaging the piston 52 and the inner face of the nut 51, which spring at all times tends to urge the piston into engagement with a stop 65 formed on the casing.

The piston is provided with a central bore 66 which is open at one end to chamber 56 by way of a plurality of ports 67 formed in the piston. The opposite end of the bore is provided with a valve seat 68 adapted to receive a valve 69 which is normally maintained in engagement with the seat by means of a spring 70. The valve 69 is provided with a port 71 of small diameter which establishes constant open communication between chamber 55 and the central bore 66.

Operation

When the train is traveling over the road the handle 16 of the brake application valve device will normally be maintained in its non-braking position in which the several parts of the valve device are positioned as shown in Fig. 1 of the drawings. With the valve device in this position chamber 55 is connected to the atmosphere by way of passage 32, port 31 in the lower rotary valve seat 10, ports 40 and 45 in the lower rotary valve 11 and port 30 in the lower rotary valve seat, and the timing reservoir 58 is vented by way of passage and pipe 57, chamber 56, ports 67 in the piston 52, central bore 66, port 71 in valve 69 and chamber 55.

When it is desired to apply the brakes from the rear of the train, the trainman moves the handle 16 and consequently the valves 9 and 11 in a clockwise direction from the position in which the handle is shown in Fig. 2 until the spring pressed detent pin enters the notch 19, at which time the trainman permits the handle to temporarily rest. With the handle 16 so positioned it will be apparent, from an inspection of Figs. 3, 4 and 5 of the drawings, that the small end of the cavity 25 in the upper rotary valve 9 will be brought into registration with the port 23 in the upper valve seat 8 and at the same time the port 33 in the lower rotary valve 11 will be brought into registration with the outer end of port 31 in the lower valve seat 10.

With the upper rotary valve 9 so positioned, the small end of the cavity 25 therein provides a restricted communication through which fluid under pressure is permitted to flow gradually from the brake pipe to the atmosphere, by way of pipe 7, chamber 6, tail port 26, cavity 25, cavity 23, passage 24 and pipe 5, thereby effecting an initial reduction in brake pipe pressure and consequently a slowing increasing service application of the brakes which produce gentle slack action throughout the length of the train. With the lower rotary valve 11 so positioned, and at the same time, fluid under pressure flows from the brake pipe to chamber 55, by way of pipe 7, chamber 6, port 33 in the lower rotary valve, port 31 in the lower rotary valve seat and passage 32.

Fluid under pressure supplied to chamber 55 flows to the timing reservoir 58, by way of small port 71, central bore 66 in the piston 52, ports 67, chamber 56 and passage and pipe 57. It will be understood however that the rate of flow of fluid to chamber 55 is at a relatively unrestricted rate while the rate of flow of fluid from this chamber to the timing reservoir is restricted by the small port 71 through the valve 68. Under these conditions the pressure of fluid supplied to chamber 55 is quickly built-up sufficiently to move piston 52 and thereby the stem 53 in a direction toward the right hand, as viewed in Fig. 1 of the drawings, against the opposing action of the spring 59 until the valve 60 is brought into seating engagement with its seat 61. With the valve 60 thus seated, the escape of fluid under pressure from chamber 56 to the atmosphere around the piston stem 53 is prevented. It will be noted that the check valve 69 will remain in seated engagement with its seat 68 due to the combined action of the spring 70 and the fluid under pressure in chamber 55.

With the stem 53 in this position the telltale groove 62 will have moved away from the outer face of the plug nut 51 to its extreme outer position, thus providing a visual guide for indicating to the trainman that the brake pipe pressure is reducing at such a rate as to insure a gentle slack action on the train and that brake control valve device in handle should not yet be moved further in the application direction to increase the rate of reduction in brake pipe pressure.

The flow of fluid under pressure from chamber 55 to the timing reservoir 58 through the small port 71, continues until the fluid pressure on both sides of the piston 52 become substantially equal. When this occurs, the spring 59 acts to cause the piston 52 and thereby the attached stem 53 to move in a direction toward the left hand until the piston is brought to a stop by its engagement with the stop 65, as shown in Fig. 1 of the drawings. With the piston 52 and attached stem 53 in this position the telltale groove 62 will have been moved to the position in which it is shown in Fig. 1, in which the inner edge of the groove 62 will be in vertical registration with the outer surface of the nut 51. The operator, seeing this will know that the brake control valve device may now be operated to the next service application position without danger of causing harsh slack action on the train.

To increase the rate of brake pipe reduction the handle 16 is now moved further in a clockwise direction causing the detent pin to be moved out of the notch 19 and in a direction towards notch 20. As the handle 16 moved in this direction and reaches a point intermediate the notches 19 and 20, the exhaust port 41 in the lower rotary valve is brought into registration with the inner end of the port 31 in the lower rotary valve seat 10. With the lower rotary valve 11 so positioned communication between chambers 6 and 55 is cut off and communication is established between chambers 55 and the atmosphere by way of passage 32, port 31 in the lower rotary valve seat 10, ports 41 and 45 in the lower rotary valve 11 and exhaust port 30 in the valve seat.

With this latter communication established fluid under pressure flows at a fast rate from chamber 55 to the atmosphere. Upon venting of fluid under pressure from chamber 55 the higher pressure in the timing reservoir 58 and in the central bore 66 of the piston and acting on one side of check valve 69 overcomes the opposing action of the spring 70, causing the check valve to move out of engagement with its seat 68. With the check valve 69 unseated fluid under pressure in the timing reservoir 58 flows to the atmosphere quickly and at a relatively unrestricted rate by way of pipe and passage 57, chamber 56, ports 67, central bore 66 in the piston 62, past unseated check valve 69, chamber 56, passage 32, port 31 in the lower rotary valve seat, ports 41 and 45 in the rotary valve and port 30 in the rotary valve seat. This venting will substantially deplete the timing reservoir of fluid under pressure and as a result of this the spring 70 acts to seat the check valve 68. The piston 52 and attached stem 53 are now conditioned for operation to its opposite positions, upon movement of the handle 16 to a position where the detent pin rides into the notch 20, as will hereinafter be described.

As movement of the handle is continued toward notch 20, communication between chamber 55 and the atmosphere is cut off by the lower rotary valve 11.

It will be noted from inspection of Fig. 3 that movement of handle 16 in a clockwise direction from notch 19 towards notch 20 results in an increase in the flow area of the arcuate cavity 25 provided in the upper rotary valve and which is in registration with cavity 23 in the upper rotary valve seat 8, thereby increasing the rate at which fluid under pressure is vented from the brake pipe through the circuit hereinbefore traced, to effect an increased rate of brake pipe reduction.

When the handle is positioned so that the spring pressed detent pin is within the notch 20 the arcuate cavity 25 in the upper rotary valve will be positioned so as to vent fluid under pressure from the brake pipe to the atmosphere at an increased rate through the same circuit traced in connection with movement of the handle to the position when the spring pressed detent pin was within the notch 19. At the same time the lower rotary valve 11 will be positioned so that the supply port 34 of the lower rotary valve 11 will be brought into registration with the outer end of port 31 in the lower rotary valve seat 11. With the lower rotary valve 11 so positioned, fluid under pressure in chamber 6 flows to chamber 55, by way of port 34 in the lower rotary valve, port 31 in the lower rotary valve seat 10, and passage 32. Fluid under pressure supplied to chamber 55 flows to the timing reservoir, as hereinbefore described, and the piston 52 and attached stem 53 are caused to move to their outer position, in the same manner as before described, so that the telltale groove 62 is again positioned in its extreme outer position.

After a predetermined interval of time determined by the size of port 71 and the volume of the reservoir 58, the spring 59 will again act to shift the piston and attached stem 53 to the position in which they are shown in Fig. 1 of the drawings, so that if it is desired to further increase the rate of brake application the trainman will be visually informed as to whether or not the rate of reduction in brake pipe pressure may be increased without danger of causing harsh slack action on the train.

To further increase the rate of reduction in brake pipe pressure the operator moves the handle and associated rotary valves 9 and 11 to the next service position which is defined by the quadrant notch 21. This further movement of the rotary valve 9 will, due to the shape of the brake valve vent cavity 25, increase the rate of reduction in brake pipe pressure and the corresponding movement of the rotary valve 11 will first cause fluid under pressure to be vented from the timing reservoir 58 by way of the exhaust port 42 in this valve and then with the valve in service position cause fluid under pressure to be supplied by way of port 35 in the valve to effect the operation of the indicating apparatus to inform the operator when he may still further increase the rate of reduction in brake pipe pressure without causing harsh slack action on the train.

When the handle and associated rotary valves are moved to the next or last service application position which is defined by the notch 22 the indicating apparatus will be caused to operate in the same manner as described in connection with each of the other service application positions, the only difference being that in this movement to the last service position the venting of fluid from the timing reservoir is by way of the exhaust port 43 in the rotary valve 11 and the supply of fluid to the chamber 55 and timing reservoir is by way of the supply port 36.

It should here be mentioned that the exhaust cavity 25 in the rotary valve 9 is so shaped that when the valve is in this last service position the rate of reduction in brake pipe pressure will not exceed the usual service rate so that a full service application of the brakes will be effected with the valve in this position.

It will be understood that while the reduction in brake pipe pressure is continuous during the time that the rotary valves 9 and 11 are being moved from the first service application position to the last service application position the rate of such reduction will be increased slowly until the normal service rate is obtained and that since the operator is informed by the automatically operated indicating apparatus as to the proper operation of the rotary valves from one service application position to the next, the brakes may be fully applied in the shortest possible time consistent with the gentle handling of the train.

*Emergency application*

If, when the several parts of the brake control valve device is in its normal non-braking position or any one of the service application positions, the train or roadbed defects are grave enough to necessitate an emergency application of the brakes, the operator moves the handle 16 and associated rotary valves 9 and 11 to the position in which the handle stops against the stop 18 of the quadrant.

With the upper rotary valve in emergency position the widest portion of the cavity 25 is in registration with the cavity 23 in the upper rotary valve seat 8, thus insuring a reduction in brake pipe pressure at an emergency rate, which reduction will of course cause an emergency application of the brakes. With the lower rotary valve 11 in emergency position the chamber 55 and timing reservoir are connected to the atmosphere by way of passage 32, port 34 in the valve seat 10, ports 44 and 45 in the valve and exhaust passage 30.

*Embodiment shown in Figs. 6 and 7*

In Figs. 6 and 7 another form of the invention is illustrated in which the means for indicating, through the trainman's sense of feel, when the several parts of the brake control valve device may be moved from one application position to the next without danger of causing harsh train slack action.

The indicating means is shown applied to the same type of valve device as is shown in Figs. 1 to 5, inclusive, and except for certain additions to the casing and handle for facilitating the mounting of the indicating means and a modification of the outer end of the piston stem 53, the details of the valve device of Figs. 6 and 7 are substantially the same as those of the device shown in Figs. 1 to 5, inclusive.

As shown, the outer end of the piston stem 53 is operatively connected to the lower end of a vertically disposed lever 100 by means of a pin 101, which lever is rockably mounted, intermediate its ends, on a pin 102 carried by a lug 103 preferably formed integral with the casing of the valve device. The upper end of the lever is provided with a spring seat 105 in which there is provided a horizontally extending opening 104. The casing section 3 is provided with a projection 106 in spaced relation with the upper end of the lever 100, which projection is provided with a bore 108 in which a horizontally movable plunger 107 is operatively mounted. The plunger is provided with a stem 109 which extends through the opening 104 in the lever 100, which stem, at its end, is screw-threaded to receive adjusting nuts 110.

Surrounding the stem and interposed between and operatively engaging one side of the plunger and the spring seat 105 of the lever 100 is a spring 111. The opposite side of the plunger is provided with a rounded projecting surface 112 adapted to engage a groove 114 in an arcuate member 113 carried by the handle 16.

*Operation of embodiment of Figs. 6 and 7*

The operation and functions of the brake control valve device proper illustrated in Figs. 6 and 7 are the same as those of the device proper shown in Figs. 1, 2, 3, 4 and 5 and need no further description here. The indicating means does however function differently from that of the indicating means shown in Figs. 1 to 5 inclusive, and will now be described in detail.

As the piston 52 is moved to its extreme right hand position by fluid under pressure supplied to chamber 55, in the same manner as described in connection with the first embodiment of the invention shown in Figs. 1 to 5 inclusive, the attached lever 100 is caused to rotate in a counterclockwise direction about the pivot pin 101, thereby forcing the spring 111 and plunger 107 in a direction toward the left hand until the rounded surface 112 of the plunger engages the arcuate member 113, within the groove 114. Continued movement of the lever 100 in this direction compressed the spring 111 and the compression of the spring forces the rounded end of the plunger tightly into engagement with the member 113, so that the effort required to move the handle 16 from one position to the next will be materially increased, thereby indicating to the operator that to insure against the danger of damage to the train the handle 16 should not be moved until the increased effort to movement of the handle is relieved.

It will be apparent from an inspection of Fig. 6 that this type of brake control valve device will also serve as a visual indicating means for when it is safe to move the handle from one application position to the next the lever 100 will be in the position shown in the drawings, that is the upper end of the lever 100 will engage the adjusting nuts 110. When it is not safe to further increase the rate of reduction in brake pipe pressure, by moving the handle from one to the next application position, the upper end of lever 100 will be in a position to the left of the adjusting nuts 110.

From the foregoing description it will be understood that I have provided a brake control valve device having means which operates automatically to guide the trainman in the operation of a brake application valve device so as to produce a full service train brake application in the shortest time consistent with smooth train slack action. It will also be understood that the indicating means provided may produce a visual indication or an indication through the sense of feel, as to the proper handle manipulation of the device.

Each of the brake controlling valve devices shown in the drawings may be employed on either long or short trains but on short trains, where the amount of slack which may run-in or run-out is not sufficient to cause damaging shocks, the automatically operated indicating means may be ignored by the operator and the device operated from its noraml non-braking position to its last or full service application position.

While two illustrative embodiments of the invention have been described in detail, it should be understood that the invention is not limited to these details of construction and that numerous changes and modifications may be made without departing from the scope of the following claims.

Having now described my invention, what I claim as new and desire to secure by Letters Patent, is:

1. A brake application valve device of the type employed for venting fluid under pressure from the brake pipe of a fluid pressure brake equipment to effect an application of the brakes, comprising in combination, a valve manually operative successively from one to another of a plurality of brake pipe venting positions to progressively increase the rate of flow of fluid from the brake pipe, fluid pressure responsive means for indicating to the operator when the valve may be moved to the next venting position without danger of causing harsh train slack action, and another valve operative upon movement of the first mentioned valve to any of said brake pipe venting positions for controlling the operation of said fluid pressure responsive means.

2. A brake application valve device of the type employed for venting fluid under pressure from the brake pipe of a fluid pressure brake equipment to effect an application of the brakes, comprising in combination, valve means manually operative successively from one to another of a plurality of brake pipe venting positions to increase the rate of flow of fluid from the brake pipe, and means set in operation upon movement of the valve means to one of its brake pipe venting positions for automatically indicating in the position of the valve means the termination of a predetermined period of time, the timing means comprising a timing reservoir adapted to be charged with fluid under pressure in said brake pipe venting position, an indicating device and a mechanism operative upon a predetermined increase in the pressure of fluid in said reservoir for actuating said device.

3. A brake application valve device of the type employed for venting fluid under pressure from the brake pipe of a fluid pressure brake equipment to effect an application of the brakes, comprising in combination, a valve manually operative successively from one to another of a plurality of brake pipe venting positions to control the rate of flow of fluid from the brake pipe, tell-tale means automatically operative in any one of said brake pipe venting positions of said valve for resisting movement of the valve to another venting position, and means operative when a predetermined period of time has elapsed with the valve in one of said venting positions for eliminating the resistance offered by said tell-tale means to movement of the valve.

4. A brake application valve device of the type employed for venting fluid under pressure from the brake pipe of a fluid pressure brake equipment to effect an application of the brakes, comprising in combination, valve means manually operative successively from one to another of a plurality of brake pipe venting positions to progressively control the rate of flow of fluid from the brake pipe, tell-tale means for indicating to the operator when the valve may be moved from one to the next of said venting positions to insure gentle handling of a train, fluid pressure responsive means comprising a mechanism for operating said tell-tale means, and a rotary valve associated with the valve means for rendering said fluid pressure responsive means operative upon movement of the valve means to a brake pipe venting position.

5. A brake application valve device of the type employed for venting fluid under pressure from the brake pipe of a fluid pressure brake equipment to effect an application of the brakes, comprising in combination, valve means manually operative successively from one to another of a plurality of brake pipe venting positions to progressively control the rate of flow of fluid from the brake pipe, tell-tale means for indicating to the operator when the valve may be moved from one to the next of said venting positions to insure gentle handling of a train, a timing reservoir adapted to be charged with fluid under pressure from the brake pipe upon movement of said valve to a brake pipe venting position, a mechanism comprising a movable abutment for actuating said tell-tale means, said abutment being subject to the opposing pressures of fluid under pressure in the brake pipe and the timing reservoir and operative to actuate said tell-tale means upon substantial equalization of fluid pressure in the brake pipe and the timing reservoir, and a choke for controlling the rate of flow of fluid from the brake pipe to said reservoir.

6. A control valve device for controlling the flow of fluid under pressure, comprising in combination, a valve movable from a normal position to either one of a plurality of control positions, and means rendered operative in at least one of said control positions for producing for a chosen interval of time a measured opposition to movement of said valve out of said one position.

CLYDE C. FARMER.